July 9, 1957  O. A. LENZ  2,798,580

TRANSVERSELY MOVING PISTON CLUTCH

Filed May 25, 1953  3 Sheets-Sheet 1

INVENTOR.
Otto A. Lenz
BY
Merchant & Merchant
ATTORNEYS

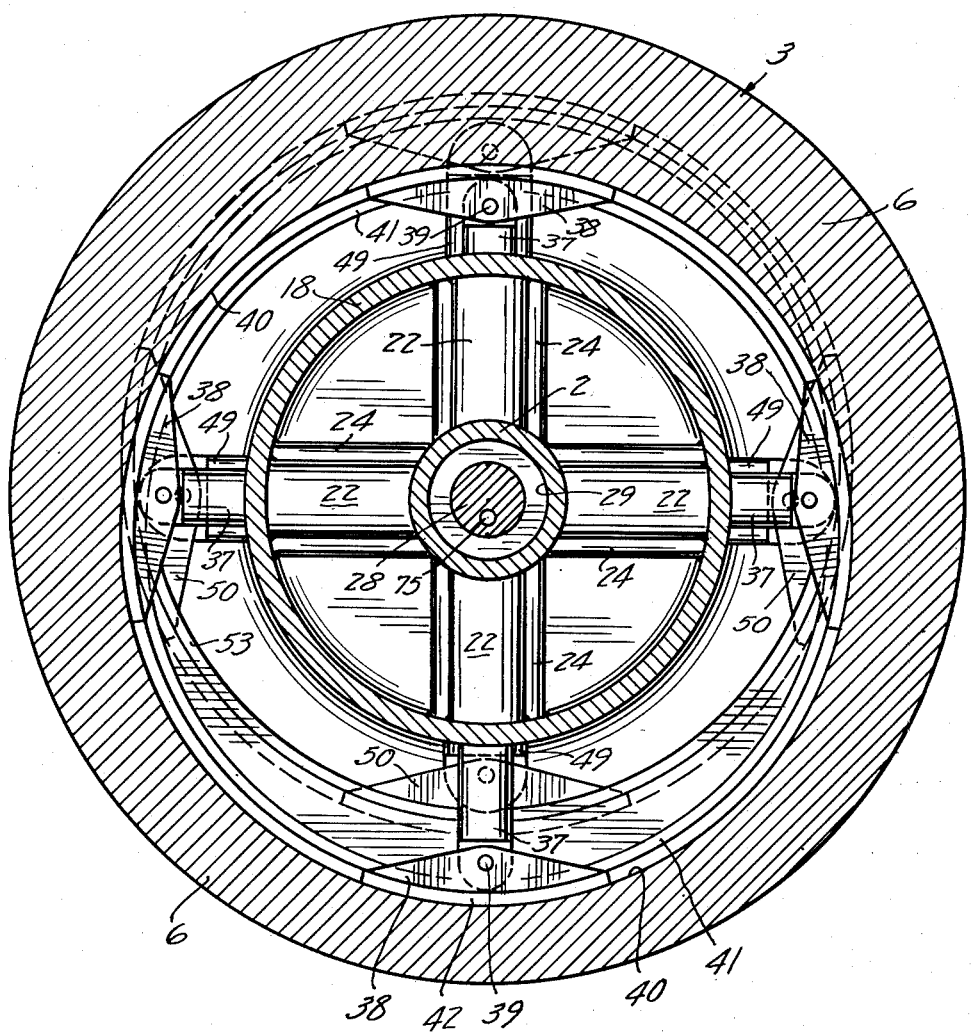

July 9, 1957  O. A. LENZ  2,798,580
TRANSVERSELY MOVING PISTON CLUTCH
Filed May 25, 1953  3 Sheets-Sheet 3
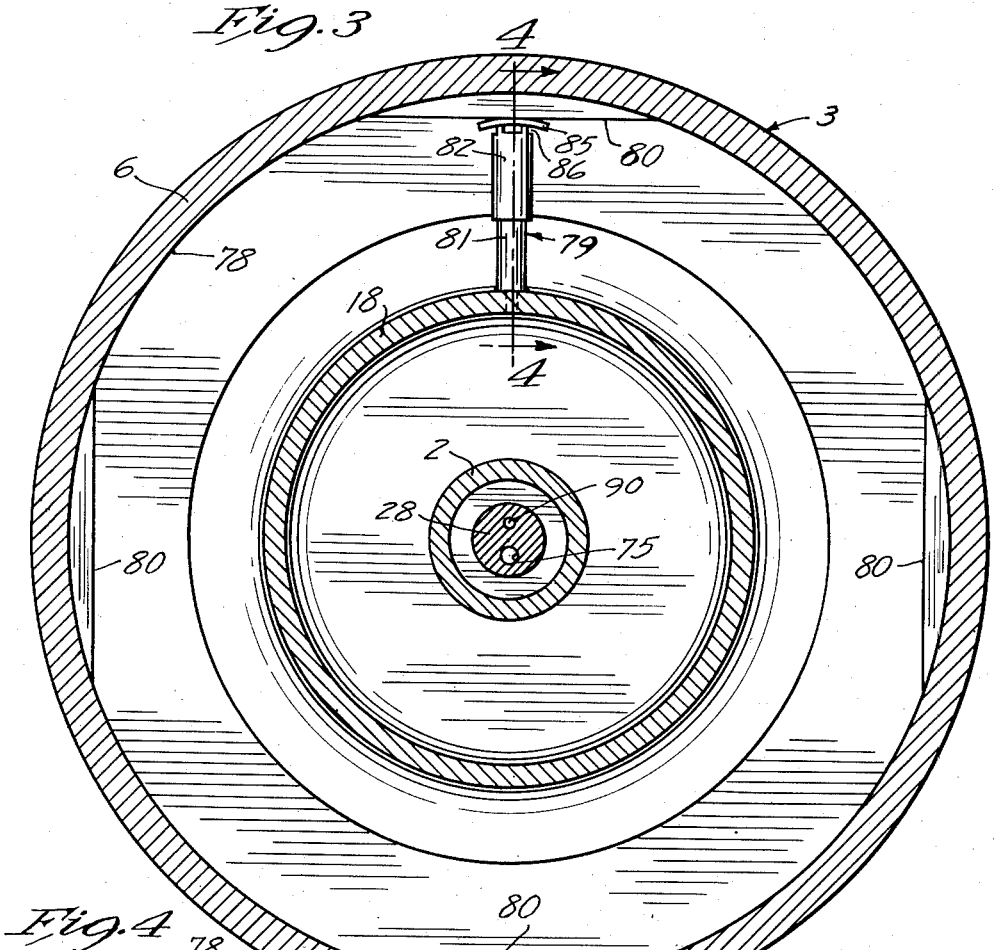
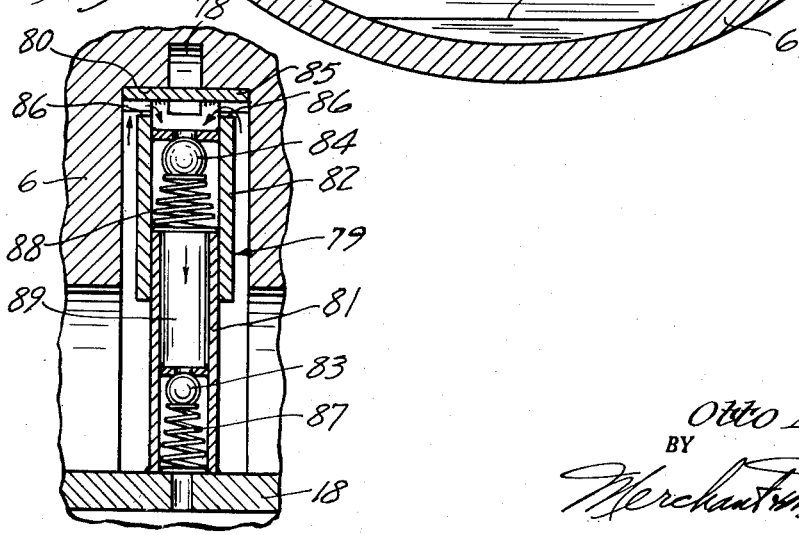
INVENTOR.
Otto A. Lenz
BY
Merchant & Merchant
ATTORNEYS

United States Patent Office 2,798,580
Patented July 9, 1957

2,798,580

TRANSVERSELY MOVING PISTON CLUTCH

Otto A. Lenz, Minneapolis, Minn.

Application May 25, 1953, Serial No. 357,107

8 Claims. (Cl. 192—60)

My invention relates generally to clutch mechanism and more particularly to clutches employing fluid operated mechanism and valving means for fluid to cause operative engagement and disengagement of the clutch elements.

More specifically, my invention involves coaxial driving and driven elements, the former of which comprises a central tubular member, a plurality of circumferentially spaced cylinders extending radially from the tubular member, and having ports communicating with the tubular member, pistons mounted for relative reciprocatory movements in the cylinders to cause movement of liquid between said cylinders through the ports and tubular member; and the latter of which comprises an endless circular cam acting track eccentric to the common axis of said elements and operatively engaging the pistons to cause relative reciprocation of the same under relative rotary movement between the driving and driven elements.

An important object of my invention is the provision of a clutch as set forth which, when engaged, will positively lock a driving means to a load for common rotary movement.

Another important object of my invention is the provision of means whereby the operation of the clutch is governed by the speed of the driving element thereof and of control means operative to vary the speed at which said clutch operation occurs.

Still another object of my invention is the provision of a clutch of the above type employing the use of displaceable liquid and having novel means for returning liquid to the system whereby to compensate for leakage thereof.

A still further object of my invention is the provision of a clutch of the type set forth in which radial thrust pressures are substantially equalized to neutralize bearing loads and produce a balanced unit.

Another object of my invention is the provision of a clutch which is unaffected by weather conditions, which is efficient in operation, and which is rugged in construction and durable in use.

The above and still further highly important objects and advantages of my invention will become apparent from the following detailed specification, appended claims and attached drawings.

Referring to the drawings, which illustrate the invention, and in which like reference characters indicate like parts throughout the several views:

Fig. 2 is a transverse section taken substantially on the line 2—2 of Fig 1;

Fig. 3 is a transverse section taken on the line 3—3 of Fig. 1; and

Fig. 4 is an enlarged fragmentary section taken substantially on the line 4—4 of Fig. 3.

Figure 1:
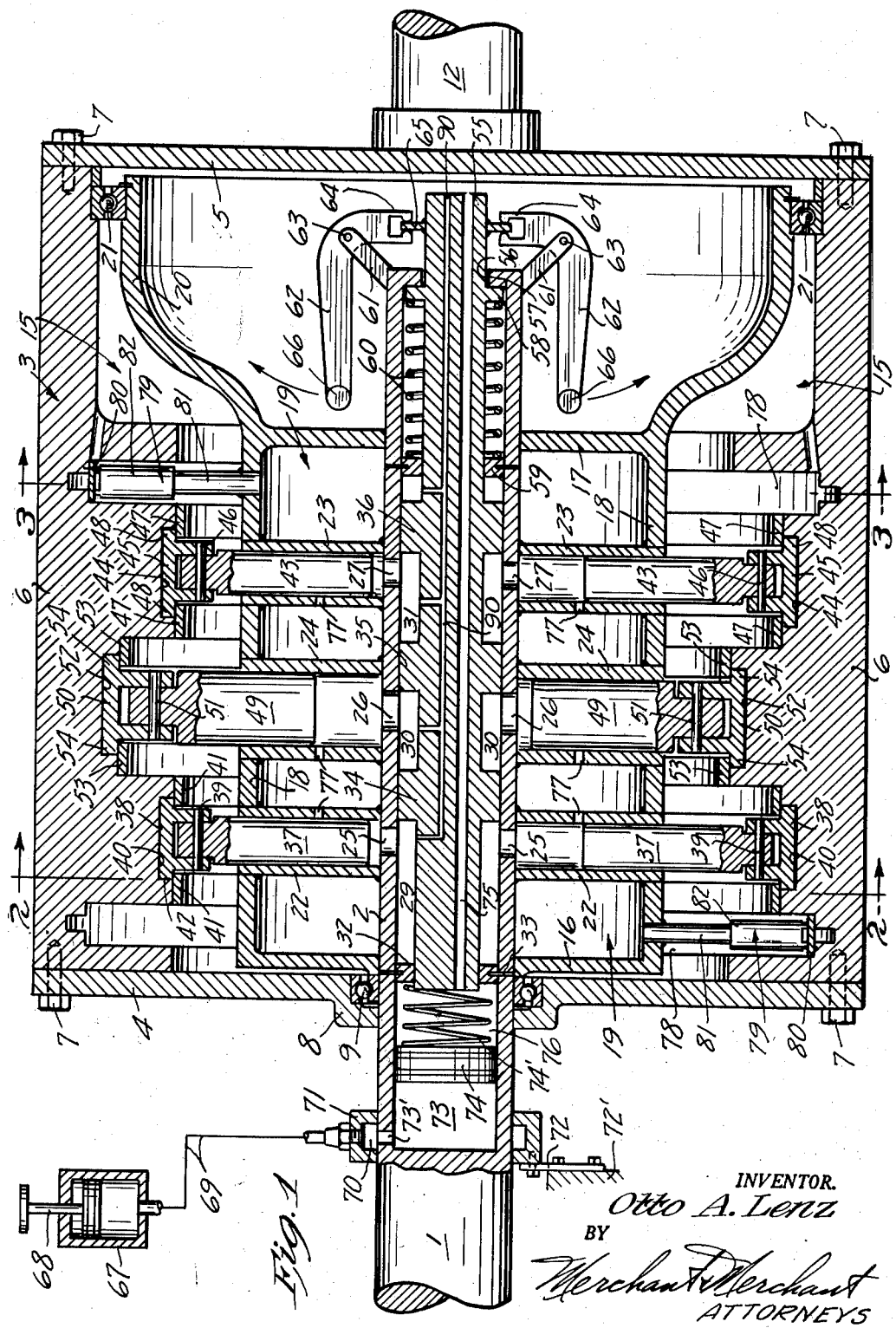
Fig. 1 is an axial section of a clutch built in accordance with my invention.

In the preferred embodiment of the invention illustrated, a driving element in the nature of a drive shaft 1 may be assumed to extend from a prime mover, not shown, and includes a tubular member or outer end portion 2. A driven element 3 is in the nature of a generally cylindrical housing comprising axially spaced end walls 4 and 5 and a cylindrical wall 6 anchored at its opposite ends to the end walls 4 and 5 by machine screws or the like 7. The end wall 4 is provided with a central boss 8 in which is mounted an antifriction bearing 9 through which the tubular end portion 2 extends. The bearing 9 journals the driven element 3 on the tubular member 1 for rotary movement relative thereto. A driven shaft 12 is rigidly secured to the center of the end wall 9 in axial alignment with the drive shaft 1. The driven shaft 12 may be assumed to comprise the input shaft to the load to be driven or to a gear box or similar transmission mechanism not shown. The driven element 3 defines an outer chamber 15 which contains the tubular member 2 and the parts carried thereby.

Integrally formed with the tubular member 2 is an inner housing structure comprising end walls 16 and 17 and a generally cylindrical wall 18 defining an inner chamber 19. The inner housing is formed to provide an axially outwardly projecting flange 20 the extreme outer end of which is supported by an antifriction bearing 21 mounted in the outer end portion of the cylindrical wall 6 adjacent the end wall 5 of the driven element 3, whereby to rigidly support the adjacent end of the tubular member 2. The driving element 1 further comprises a plurality of axially spaced groups of circumferentially spaced cylinders 22, 23 and 24 projecting radially outwardly from the tubular member 2 through the cylindrical wall 18 of the inner housing. These cylinders open outwardly into the outer chamber 15, and at their inner ends communicate with the interior of the tubular member 2 by means of ports 25, 26 and 27 respectively. With reference to Figs. 1 and 2 it will be seen that the cylinders 22 and 23 are of substantially the same diameter whereas the cylinders 24 are of a substantially larger diameter than the cylinders 22 and 23, in fact, and for a purpose which will hereinafter become apparent, the cross sectional area of each cylinder 24 is substantially twice that of each cylinder 22 and 23. Preferably and as shown, the cylinders of the several groups are disposed about the common axis of the driving and driven elements in opposed pairs. In the drawings I have shown that each group consists of four cylinders equally spaced about the axis of the tubular member 2, any suitable plurality thereof may be used to advantage.

Mounted for axial sliding movements within the tubular member 2 is a spool-like valve element 28 which with the tubular member 2 defines a plurality of compartments 29, 30 and 31. The opposite ends of the compartment 29 are defined by an annular collar 32 mounted fast in the tubular member 2 by means of pins or the like 33 and a relatively wide annular flange 34 integrally formed with the valve element 28. The flange 34 cooperates with a similar flange 35 to provide the annular opposite end walls of the annular compartment 30 whereas the flange 35 cooperates with a similar flange 36 of the valve element 28 to provide the annular end walls of the compartment 31. This arrangement provides for transfer of liquid between the cylinders of each group independently of the other groups thereof. For instance, liquid may be transferred from one of the cylinders 22 to each of the other cylinders 22 through the ports 25 and the annular compartment 29. Similarly liquid is transferred between cylinders 23 through the ports 27 and the compartment 31, whereas liquid is transferred from one cylinder 24 through the others thereof through the ports 26 and the compartment 30. With reference to Fig. 1 it will be seen that the flanges 34, 35 and 36 of the valve element 28 are of greater width than the diameters of the ports 25, 26 and 27 hence, axial movement of the valve element 28 in a direction from the right to the left with respect to Fig. 1 will cause the ports to be simultaneously partially or fully closed. In other words, movement of the valve element 28 increases or decreases the effective diameters or sizes of the several ports between fully open and fully closed positions.

A plurality of pistons 37 are mounted each in a different one of the cylinders 22 for reciprocatory movements relative thereto and are provided at their outer ends with shoes 38 hingedly mounted thereto as indicated at 39. The shoes 38 bear against a cam in the nature of an endless circular track or eccentric 40 formed in the cylinder wall 6 and are held thereagainst by retaining rings or the like 41 that overlie and engage laterally outwardly projecting tongues 42 on the shoes 38. The circular cam track 40 is disposed eccentric to the common axis of the driving and driven elements 1 and 3 respectively and operatively engages the pistons 37 through the shoes 38 thereof whereby to impart relative reciprocatory movements between the pistons 37 and their respective cylinders 22 upon relative rotation between the driving element 1 and the driven element 3. If desired, the retaining rings 41 may be positively locked in place by any suitable means not shown.

A plurality of pistons 43 are mounted for relative reciprocatory movements one each in a different one of the cylinders 23 the outer ends of the pistons 43 are operatively engaged by an endless circular eccentric track 44 through the medium of shoes 45 pivotally mounted on the outer ends of the pistons 43 as indicated at 46. Annular retaining rings 47 similar to the rings 41 engage laterally outwardly projecting tongues on the shoes 45 to hold the same in position against the circular track or cam 44. The circular track 44 is circular in form and like the circular track 40 is eccentric to the common axis of the driving and driven elements 1 and 3 respectively. In the preferred embodiment of the invention illustrated, the circular track 44 is angularly coincident with the circular track 40 whereby the pistons 43 and 37 in the same plane and at the same side of the tubular member 2 will partake of simultaneously reciprocatory movement in like directions relative to their respective cylinders.

The relatively large cylinders 24 have mounted for relative reciprocatory movement therein pistons 49 that are provided at their radially outer ends with shoes 50 hingedly secured thereto as indicated at 51. The shoes 50 bear against a circular track or eccentric 52 that is eccentric to the common axis of the driving and driven elements 1 and 3 respectively and which is angularly spaced 180° from the tracks 40 and 44. Thus, during simultaneous radially inward movement a pair of relatively small diameter pistons 37 and 43 in the same plane at one side portion of the tubular member 2, a relatively large piston 49 in the same plane and at the same side of the tubular member 2 will be moving radially outwardly, its opposing piston 49 moving radially inwardly, such radial movement being imparted to the pistons by their respective eccentric tracks during relative rotation between the driving and driven elements 1 and 3 respectively. It should be understood that the inner chamber 19 as well as each of the compartments 29, 30 and 31 and the cylinders 22, 23 and 24 are filled with suitable liquid such as oil. Thus when any one of the pistons are moved radially inwardly, oil is forced through their respective ports and compartments within the tubular member 2 into other cylinders wherein the pistons thereof are moved radially outwardly. It will also be noted with respect to Fig. 1 that the shoes 50 are held against the eccentric track 52 by retaining rings 53 similar to the retaining rings 41 and 47 and which engage laterally outwardly projecting tongues 54 on the shoes 50.

The position of the valve element 28 in the tubular member 2 determines the degree of slippage between the driving element or shaft 1 and the driven shaft 12.

When the valve element 28 is positioned as in Fig. 1 with the several ports 25, 26 and 27 fully open, free movement of oil between the cylinders of each group occurs and substantially no pressure is applied to the eccentric tracks 40, 44 and 52 between the respective shoes 28, 45 and 50, the friction therebetween being negligible particularly when a substantial load is applied to the driven shaft 12. Movement of the valve element 28 from the right to the left with respect to Fig. 1 will cause the several flanges 34, 35 and 36 to gradually reduce the effective area of their respective ports 25, 26 and 27 thereby restricting the flow of oil therethrough. Such restriction will cause greater pressures to be built up in the cylinders against radial inward movement of the pistons therein and consequently greater frictional contact between the shoes and their respective eccentric tracks. Movement of the valve element 28 sufficient to completely close the several ports 25, 26 and 27 and effectively lock the several pistons against movement, thereby wedging the shoes 38, 45 and 50 against their respective eccentric tracks and causing positive driving engagement between the shaft 1 and the driven element 3. Obviously, as soon as the valve element 28 is again moved in a direction to open the several ports in the tubular member 2, movement of oil between the cylinders in each group thereof will recur and slippage will again take place between the driving and driven elements.

I provide automatic means for moving the valve element 28 in opposite directions to open and close the ports 25, 26 and 27 responsive to changes in speed of the driving element 1, such means comprising means yieldingly urging the valve element 28 in one direction of movement and a speed-controlled weight-operated device for moving the valve element 28 in a direction against the yielding urge of said means. The valve element 28 has one end 55 projecting outwardly through a reduced opening 56 formed by an inturned flange 57 at the free end of the tubular member 2. The valve element 28 is formed to provide an annular flange 58 which normally bears against the flange 57 within the tubular member 2 when the flanges 34, 35 and 36 are in a port-open position. Mounted in the tubular member 2 in axially spaced relation to the end flange 57 thereof is a stop collar or the like 59 which forms an abutment for one end of a coil compression spring 60 interposed therebetween and the flange 58 of the valve element 28 whereby to urge the valve element in a port-open direction. A pair of diametrically opposed brackets 61 extend angularly outwardly from the end of the tubular member 2 adjacent the end 55 of the valve element 28 and have pivotally mounted on their outer ends a pair of levers 62. As shown the levers are pivoted intermediate their ends to the brackets 61 by means of pins or the like 63 and are bifurcated at their inner ends 64 where they engage diametrically opposed portions of an annular flange 65 rigidly secured to the outer end portion 55 of the valve element 28. At their opposite ends the levers 62 are provided with weights 66 which move outwardly under centrifugal action of the driving element 1. This outward movement of the weighted ends of the levers 62 causes the valve element 28 to be moved inwardly against bias of the spring 60 in a port-closed direction.

For the purpose of controlling the action of the levers 62 so that a greater relative speed of rotation may be obtained between the driving and driven elements prior to closing of the ports in the tubular member 2, I provide manually operated means for preventing lever-operated port-closing movement of the valve element 28, said means comprising a fluid pressure cylinder 67 and a manually operated piston plunger 68. A conduit 69 extends from the cylinder 67 to an annular passage 70 in a collar 71 which is journalled on the drive shaft 1 and held against rotary movement by suitable means such as a brace member or arm 72 rigidly secured to the collar 71 and a stationary portion of the prime mover, indicated at 72'. The annular passage 70 communicates with a compartment 73 in the shaft 1 by means of openings 73' in the tubular member 2, see Fig. 1. The opposite ends of the compartment 73 are defined by the shaft 1 and a floating piston 74 movable toward and away from the adjacent end of the valve element 28. The piston 74 is yieldingly urged away from the valve element 28 by a relatively weak coil compression spring 74'. A fluid passage 75 extends longitudinally through the valve element 28 from the compartment containing the spring 74, said compartment being identified at 76. Preferably, the piston plunger 68 is disposed within easy reach of the operator, and movement of said piston plunger in one direction will cause fluid under pressure to be introduced into the compartment 73 sufficient to move the piston 74 axially into engagement with the valve element 28 and hold the same against axial movement in a direction to close the several ports 25, 26 and 27. Sufficient fluid pressure may be exerted against the piston 74 to overcome the tendency of the weighted levers 62 to swing outwardly in a port closing direction until a desired drive shaft speed is obtained. At this point, release of the piston plunger 68 will permit said levers to swing in a direction to move the valve element 28 in a port closing direction and cause flow of fluid in a reverse direction from the compartment 73 to the fluid pressure cylinder 67. With this arrangement, slippage between the driving and driven elements may be controlled to the exact requirements imposed by varying load conditions.

It has been found that, when the several ports 25, 26 and 27 are partially closed by the valve element 28, the passage of oil between cooperating cylinders in a single group is restricted sufficiently to cause a void or negative pressure to occur in a radially outwardly moving piston, such a void is also due partially to leakage of oil between pistons and their cooperating cylinders outwardly to the outer chamber 15. In order to maintain the several compartments 29, 30 and 31 in a relatively oil-filled condition, I provide ports 77 in each of the cylinders 22, 23 and 24 and located in the cylindrical side wall portions thereof at a point just radially inwardly of the inner ends of the pistons 37, 43 and 49 when said pistons are moved to their outer limits of reciprocatory movement. Thus, if a negative pressure condition is present in any of the cylinders during outward movement of the pistons thereof, oil will be drawn into the cylinders when the pistons thereof are at their outer limits of movement whereby to replenish the supply therein and overcome said void or negative pressure condition.

Although, for the purpose of maintaining an efficient unit, leakage of oil outwardly between the cylinders and their respective pistons should be held to a reasonable minimum, such leakage of oil to a certain extent is beneficial by reason of the fact that lubrication is provided for the shoes 38, 45 and 50 and their respective eccentric tracks 40, 44 and 52, as well as for the antifriction bearing 21. Oil accumulating in the outer chamber 15 gravitates to a pair of axially spaced annular grooves 78 from whence the oil is pumped inwardly to the inner chamber 19 by means of a pair of pumps 79 one each working in one of the grooves or channels 78. With reference to Fig. 3 it will be seen that each of the channels 78 is formed to provide a plurality of cam surfaces 80. The pumps 79 include inner and outer tubular telescoping members 81 and 82 respectively each thereof being provided with a check valve 83 and 84. The radially outer end of the section 82 is provided with a shoe 85 between which and the outer end of section 82 is formed a plurality of openings 86. With reference to Fig. 4 it will be seen that the check valve 83 is biased toward a closed position by a spring 87 whereas the check valve 84 is yieldingly biased toward a closed position by a coil compression spring 88 which also yieldingly biases the tubular section 82 in an outward direction toward engagement of the shoe 85 with the cam surfaces 80 and the bottom of the channel 78. Under relative rotation between the driving and driven elements 1 and 3 respectively, when the shoes 85 of the pumps 79 are disposed between circumferentially spaced cam surfaces 80, closing pressure exerted by the spring 88 on the check valve 84 is relatively light, and oil contained in the channels 78 enters through the ports 86 and the check valve 84 to a chamber 89 between the check valves 84 and 83. Then when the shoes 85 engage the cam surfaces 80, the outer pump section 82 moves radially inwardly thereby forcing oil from the chamber 89 through the check valve 83 to the interior of the inner chamber 19 from whence it is fed inwardly through the ports 77 in the cylinder walls to the interior of the tubular element 2. Obviously when the ports in the tubular element are closed there is no relative rotation between the driving and driven elements and no pumping action occurs. A bleeder passage 90 extends longitudinally of the valve element 28 from the various compartments 29, 30 and 31 whereby to rid said compartments of air which might accumulate therein. Said bleeder passage opens outwardly of the end 55 of the valve element 28 and any oil escaping therefrom will find its way back to the outer chamber 15 through the antifriction bearing 21 from whence it is pumped back to the inner chamber 19 by one of the pumps 79.

While the above-described clutch is capable of a wide variety of uses, it is intended for use in the driving connections of an automotive vehicle. When used for this purpose, under normal conditions, the valve element 28 moves to gradually close the several ports 25, 26 and 27 upon gradual outwardly swinging movements of the levers 62 caused by acceleration of rotation of the driving shaft 1. Under severe driving conditions such as for instance the starting of a vehicle from a standstill up a relatively steep incline, the engine coupled to the drive shaft 1 may be accelerated to a greater speed before the clutch is engaged simply by manipulation of the piston plunger 68 in a direction to overcome the centrifugal force applied to the weighted levers 62. With this arrangement the clutch may be made to slip whenever desired while maintaining a relatively rapid engine speed.

The above-described arrangement of cylinders illustrates a single means of maintaining static balance as well as a balance of thrust pressures against various parts of the clutch mechanism. However, I do not wish to be limited to this particular arrangement, nor to the details of construction shown and described, it being understood that my novel clutch is capable of modification within the spirit and scope of the invention as defined in the claims.

What I claim is:

1. A clutch comprising, coaxial driving and driven elements, one of said elements comprising a central axially extending tubular member and a plurality of circumferentially spaced cylinders extending radially outwardly therefrom, the radially inner ends of said cylinders defining ports for the passage of liquid between said cylinders and said tubular member, a plurality of pistons each mounted for relative reciprocatory movement in a different one of said cylinders, the other of said elements defining an internal circular track surrounding the outer ends of the cylinders and eccentric to the axis of said elements, said circular track operatively engaging the outer ends of said pistons and imparting relative reciprocatory movement thereto upon relative rotation between said driving and driven elements, track imparted relative inward movement of one of said pistons causing displacement of liquid from its cooperating cylinder through the port thereof into said tubular member and from thence to the cylinder of a relatively outwardly moving piston through the port in its cooperating cylinder, a valve element movable in said tubular member to vary the rate of flow of liquid between the cylinders through said ports, and means on said one of the elements defining a liquid chamber adjacent said cylinders, the side wall portions of said cylinders having apertures intermediate their ends providing communication between the cylinders and chambers, said apertures being so located in their respective cylinders as to be covered and closed by their respective cooperating pistons in all positions of the latter except the outer positions thereof and to be open to said chamber when the pistons are in said outer positions.

2. A clutch comprising, coaxial driving and driven elements, one of said elements comprising a central axially extending tubular member and a plurality of circumferentially spaced cylinders extending radially outwardly therefrom, the radially inner ends of said cylinders defining ports for the passage of liquid between said cylinders and said tubular member, a plurality of pistons each mounted for relative reciprocatory movement in a different one of said cylinders, the other of said elements defining an internal circular track surrounding the outer ends of the cylinders and eccentric to the axis of said elements, said track operatively engaging the outer ends of said pistons and imparting reciprocatory movement thereto upon relative rotation between said driving and driven elements, track imparted relatively inward movement of one of said pistons causing displacement of liquid from its cooperating cylinder through the port thereof into said tubular member and from thence to the cylinder of a relatively outwardly moving piston through the port in its cooperating cylinder, a valve element mounted in said tubular member for axial movements in opposite directions to vary the rate of flow of liquid between the cylinders through said ports, said valve element having portions movable into and out of registration with said ports to vary the effective sizes thereof between fully closed and fully open positions, and means on said one of the elements defining a chamber for liquid adjoining said cylinders, the side wall portion of said cylinders having apertures intermediate their ends orientated to communicate with said chamber and the interiors of said cylinders, when the pistons therein are positioned at their outer limit of relative reciprocatory movement and to be closed by said pistons when the pistons are in their intermediate and inner positions.

3. A clutch comprising, coaxial inner and outer driving and driven elements respectively, said driving inner element comprising a central axially extending tubular member and a plurality of circumferentially spaced cylinders extending radially outwardly therefrom, the radially inner ends of said cylinders defining ports for the passage of liquid between said cylinders and said tubular member, a plurality of pistons each mounted for relative reciprocatory movement in a different one of said cylinders, said driven outer element defining an internal circular track surrounding the outer ends of the cylinders and eccentric to the axis of said elements, said track operatively engaging the outer ends of said pistons and imparting relative reciprocatory movement thereto upon relative rotation between said driving and driven elements, track imparted relatively inward movement of one of said pistons causing displacement of liquid from its cooperating cylinder through the port thereof into said tubular member and from therein to the cylinder of a relatively outwardly moving piston through the port in its cooperating cylinder, a valve element mounted in said tubular member for axial movements in opposite directions to vary the rate of flow between the cylinders through said ports, said valve element having portions movable into and out of registration with said ports to vary the effective sizes thereof, means yieldingly urging said valve element toward a port-open position, mechanism operative responsive to rotation of the driving element at a predetermined speed to move said valve element in a direction to close said ports against the yielding urge of said last-mentioned means, and means on said driving inner element defining a chamber for liquid adjoining said cylinders, the side wall portions of said cylinders having apertures intermediate their ends orientated to communicate with said chamber and the interiors of said cylinders when the pistons therein are positioned at their outer limit of relative reciprocatory movement.

4. A clutch comprising, coaxial driving and driven elements; one of said elements comprising a central axially extending tubular member and a plurality of circumferentially spaced cylinders extending radially outwardly therefrom; the radially inner ends of said cylinders defining ports for the passage of liquid between said cylinders and said tubular member; a plurality of pistons each mounted for relative reciprocatory movement in a different one of said cylinders; the other of said elements defining a generally cylindrical chamber surrounding said one of the elements; a wall portion of said chamber providing an endless internal cam surrounding the outer ends of the cylinders and eccentric to the axis of said elements; said cam operatively engaging the outer ends of said pistons and imparting relative reciprocatory movement thereto upon relative rotation between said driving and driven elements; cam imparted inward movement of one of said pistons causing displacement of liquid from its cooperating cylinder through the port thereof into said tubular member and from thence to the cylinder of a relative outwardly moving piston through the port in its cooperating cylinder; a valve element movable in said tubular member to vary the rate of flow of liquid between the cylinders through said ports; a pump for delivering liquid accumulating in said outer chamber, by leakage between said cylinders and their cooperating pistons, to the interior of said cylinders; and means on the other of said elements operative responsive to relative rotation between said driving and driven elements to impart pumping movements to said pump.

5. A clutch comprising; coaxial driving and driven elements; one of said elements comprising a central axially extending tubular member and a plurality of circumferentially spaced cylinders extending radially outwardly therefrom; the radially inner ends of said cylinders defining ports for the passage of liquid between said cylinders and said tubular member; a plurality of pistons each mounted for relative reciprocatory movement in a different one of said cylinders; the other of said elements defining an outer chamber surrounding said one of the elements; a wall portion of said outer chamber providing an endless circular internal cam surrounding the outer ends of the cylinders and eccentric to the axis of said elements; said cam operatively engaging the outer ends of said pistons and imparting relative reciprocatory movement thereto upon relative rotation between said driving and driven elements; cam imparted relative inward movement of one of said pistons causing displacement of liquid from its cooperating cylinder through the port thereof into said tubular member and from thence to the cylinder of a relatively outwardly moving piston through the port in its cooperating cylinder; a valve element movable in said tubular member to vary the rate of flow of liquid between the cylinders through said ports; means on said one of the elements defining an inner chamber for liquid adjoining said cylinders; the side wall portions of said cylinders having apertures intermediate their ends communicating with said inner chamber and the interior of said cylinders when the pistons are positioned at their outer limits of relative reciprocatory movement; a pump for delivering liquid accumulating in said outer chamber, by leakage between said cylinders and their cooperating pistons, to said inner chamber; and means on the other of said elements for imparting pumping movements to said pump under relative rotation between said driving and driven elements.

6. The structure defined in claim 5 in which said pump includes a radially movable plunger element, and in which the means for imparting pumping movements to said pump comprises a generally circular track defining a cam engageable by said plunger element.

7. A clutch comprising, coaxial driving and driven elements, one of said elements comprising a central axially extending tubular member, a pair of axially spaced groups of circumferentially spaced cylinders of relatively small diameter and a single group of circumferentially spaced cylinders of relatively large diameter intermediate said first-mentioned groups, each cylinder of said intermediate group having a cross sectional area substantially twice that of each cylinder of said first-mentioned groups, the radially inner ends of said cylinders defining ports for the passage of liquid between said cylinders and said tubular member, a plurality of pistons each mounted for relative reciprocatory movements in a different one of said cylinders, the other of said elements defining a plurality of endless internal circular cams each surrounding a different group of said pistons and eccentric to the common axis of said elements, said cams operatively engaging the outer ends of their respective pistons and imparting relative reciprocatory movement thereto upon relative rotation between said driving and driven elements, the circular cam operatively associated with the pistons of said relatively large cylinders being angularly spaced 180° about the common axis of said elements with respect to the cams associated with the pistons of said relatively small cylinders, whereby radially inward thrust of a piston in said intermediate group will occur simultaneously with the inward thrust of pistons at a diametrically opposite side of said tubular member in said first-mentioned groups, cam imparted relatively inward movement of the pistons of each group thereof causing displacement of liquid from their cooperating cylinders through the ports thereof into said tubular member and from thence to the cylinders of relatively outwardly moving pistons in the same group thereof through the ports in their cooperating cylinders, and a valve element movable in said tubular member to vary the rate of flow of liquid between the cylinders of each group through their respective ports, said valve element having portions movable into and out of registration with said ports to vary the effective sizes thereof between fully closed and fully open positions.

8. A clutch comprising, coaxial driving and driven elements, one of said elements comprising a central axially extending tubular member and a plurality of circumferentially spaced cylinders extending radially outwardly therefrom, the radially inner ends of said cylinders defining ports for the passage of liquid between said cylinders and said tubular member, a plurality of pistons each mounted for relative reciprocatory movement in a different one of said cylinders, the other of said elements defining an internal circular track surrounding the outer ends of the cylinders and eccentric to the axis of said elements, said eccentric track operatively engaging the outer ends of said pistons and imparting relative reciprocatory movement thereto upon relative rotation between said driving and driven elements, track imparted relatively inward movement of one of said pistons causing displacement of liquid from its cooperating cylinder through the port thereof into said tubular member and from thence to the cylinder of a relatively outwardly moving piston through the port in its cooperating cylinder, a valve element mounted in said tubular member for axial movements in opposite directions to vary the rate of flow of liquid between the cylinders through said ports, said valve element having portions movable into and out of registration with said ports to vary the effective sizes thereof, means yieldingly urging said valve element toward a port-open position, a lever pivotally mounted at spaced points thereon to the valve element and to said tubular member, the free end of said lever being adapted to swing generally radially outwardly under rotation of said driving element at a predetermined speed to move said valve element axially in a direction to close said ports against bias of said yielding means, said yielding means comprising a coil compression spring interposed between axially spaced annular shoulders one on said valve element and the other in said tubular member, said shoulders defining opposite ends of an annular chamber containing said spring, and manually operated control means for rendering inoperative the mechanism for moving said valve element, said control means comprising a cylinder, a manually operated piston in said cylinder, a cylindrical chamber in said driving element, a valve element engaging piston in said cylindrical chamber, and conduit connections between said cylinder and said cylindrical chamber, movement of said piston in one direction causing fluid under pressure to be introduced to said cylindrical chamber to move said piston into engagement with the adjacent end of the valve element whereby to augment the yielding bias of said spring.

References Cited in the file of this patent
UNITED STATES PATENTS

| | | |
|---|---|---|
| 1,088,514 | Barricklow | Feb. 24, 1914 |
| 2,022,663 | Grey et al. | Dec. 3, 1935 |
| 2,120,293 | Messenger | June 14, 1938 |
| 2,204,261 | Fraser | June 11, 1940 |
| 2,313,049 | Cook | Mar. 9, 1943 |
| 2,386,459 | Hautzenroeder | Oct. 9, 1945 |